United States Patent
Tupe et al.

(10) Patent No.: US 10,308,737 B2
(45) Date of Patent: Jun. 4, 2019

(54) PROCESS FOR POLYMERISING ULTRA-HIGH MOLECULAR WEIGHT POLYETHYLENE

(71) Applicant: BOREALIS AG, Vienna (AT)

(72) Inventors: Ravindra Tupe, Mumbai (IN); Pernilla Fagerstolt, Helsinki (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/515,907

(22) PCT Filed: Sep. 29, 2015

(86) PCT No.: PCT/EP2015/072437
§ 371 (c)(1),
(2) Date: Mar. 30, 2017

(87) PCT Pub. No.: WO2016/050774
PCT Pub. Date: Apr. 7, 2016

(65) Prior Publication Data
US 2017/0247483 A1    Aug. 31, 2017

(30) Foreign Application Priority Data

Sep. 30, 2014 (EP) .................................. 14187026

(51) Int. Cl.
*C08F 110/02* (2006.01)
(52) U.S. Cl.
CPC .................. *C08F 110/02* (2013.01)
(58) Field of Classification Search
None
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,582,816 A | 4/1986 | Miro | |
| 5,391,654 A | 2/1995 | Ahvenainen et al. | |
| 2001/0051697 A1* | 12/2001 | Morse ................ | C08F 10/00 526/119 |
| 2013/0253125 A1* | 9/2013 | Kock ................ | C08L 23/10 524/528 |

FOREIGN PATENT DOCUMENTS

| | | |
|---|---|---|
| CN | 102417555 A | 4/2012 |
| EP | 0047007 A1 | 3/1982 |
| EP | 0372239 A2 | 6/1990 |
| EP | 0479186 A2 | 4/1992 |
| EP | 683176 A1 | 11/1995 |
| EP | 688794 A1 | 12/1995 |
| EP | 810235 A2 | 12/1997 |
| EP | 891990 A2 | 1/1999 |
| EP | 1310295 A1 | 5/2003 |
| EP | 1415999 A1 | 5/2004 |
| EP | 1591460 A1 | 11/2005 |
| EP | 1600276 A1 | 11/2005 |
| GB | 1272778 A | 5/1972 |
| JP | S6339902 A | 2/1988 |
| JP | 2000017124 A | 1/2000 |
| JP | 2006274159 A | 10/2006 |
| WO | 1992012182 A1 | 7/1992 |
| WO | 1996018662 A1 | 6/1996 |
| WO | 9951646 A1 | 10/1999 |
| WO | 0155230 A1 | 8/2001 |
| WO | 0181432 A1 | 11/2001 |
| WO | 02088194 A1 | 11/2002 |
| WO | 2003106510 A1 | 12/2003 |
| WO | 2005118655 A1 | 12/2005 |
| WO | 2007025640 A1 | 3/2007 |
| WO | 2009076733 A1 | 6/2009 |
| WO | 2011058091 A1 | 5/2011 |
| WO | WO-2012138995 A2 * | 10/2012 ............ C08F 110/02 |
| WO | 2013092282 A1 | 6/2013 |

OTHER PUBLICATIONS

Keii et al., "A kinetic argument for a quasi-living polymerization of propene with a MgC12-supported catalyst", Makromol. Chem., Rapid Commun. 8, 583-587 (1987).
Rheological characterisation of polyethylene fractions Heino, E.L., Lehtinen, A., Tanner J., Seppälä, J., Neste Oy, Porvoo, Finland, Theor. Appl. Rheol., Proc. Int. Congr. Rheol, 11th (1992), 1, 360-362.
The influence of molecular structure on some rheological properties of polyethylene, Heino, E.L., Borealis Polymers Oy, Porvoo, Finland, Annual Transactions of the Nordic Rhoology Society, 1995.).
Definition of terms relating to the non-ultimate mechanical properties of polymers, Pure & Appl. Chem., vol. 70, No. 3, pp. 701-754, 1998.
International Search Report and Written Opinion, issued in International Application No. PCT/EP2015/072437, dated Jan. 28, 2016.

* cited by examiner

*Primary Examiner* — Catherine S Branch
(74) *Attorney, Agent, or Firm* — Roberts Mlotkowski Safran Cole & Calderon, P.C.

(57) ABSTRACT

The present invention deals with a process for polymerizing ethylene in the presence of an olefin polymerization catalyst comprising titanium, magnesium and halogen in at least one polymerization stage where ethylene is polymerized in slurry, the process comprising treating the polymerization catalyst in a pre-treatment step by polymerizing an olefin on the polymerization catalyst so that the ratio of the weight of the olefin polymer to the weight of the original solid catalyst component is from 0.1 to 10 g/g and using the pre-treated catalyst in the production of ultra-high molecular weight polyethylene.

15 Claims, No Drawings

PROCESS FOR POLYMERISING ULTRA-HIGH MOLECULAR WEIGHT POLYETHYLENE

The present invention is directed to a process of producing polyethylene having a very high molecular weight. Especially, the invention is directed to a process of producing ultra-high molecular weight polyethylene in slurry polymerisation. In particular, the present invention is directed to a process of producing ultra-high molecular weight polyethylene in slurry polymerisation where the polymer particles have good morphology and the amount of agglomerated polymer is low.

FIELD OF THE INVENTION

The patent application WO-A-2013/092282 discloses a process for polymerising ethylene in the presence of a catalyst which had been pre-treated by first prepolymerising with propylene and then with ethylene. The catalyst was reported to give good results under drastic polymerisation conditions, such as at high hydrogen concentration. The polymers produced in the examples were reported to have $MFR_2$ of from 0.3 to 120 g/10 min.

CN-A-102417555 discloses a process where ultra-high molecular weight polyethylene was produced in the presence of a Ziegler-Natta catalyst and an external donor.

WO-A-2009076733 discloses a process where ultra-high molecular weight polyethylene is produced in two successive polymerisation stages.

WO-A-2011/058091 discloses a process for polymerising propylene where a metallocene catalyst is first prepolymerised with propylene so that the ratio of the amount of prepolymer to the amount of catalyst is from 0.1/1 to 20/1, in particular from 0.5/1 to 5/1. The catalyst is used in subsequent polymerisation by passing it through a second prepolymerisation stage where from 100 to 1000 grams, preferably from 150 to 600 grams of prepolymer is formed on the catalyst. The thus prepolymerised catalyst is then used in the polymerisation of propylene.

JP-A-2000017124 discloses a process producing propylene polymer compositions where the catalyst is first prepolymerised with propylene, then it is used in ethylene polymerisation for producing ultra-high molecular weight polyethylene at a temperature within the range of from −40 to 40° C. in a first step and then in propylene polymerisation for producing the propylene polymer composition. The example disclosed that the prepolymerisation was conducted at a temperature of −2° C. and the catalyst contained 3 grams of propylene polymer per 1 gram of the solid catalyst component. The time used for the prepolymerisation was 40 minutes. The amount of the propylene polymer in the ultra-high molecular weight polyethylene was high, 4.5% in the example.

JP-A-2006274159 discloses that ultra-high molecular weight polyethylene was produced in the presence of a Ziegler-Natta catalyst. The catalyst could be prepolymerised. No prepolymerisation was disclosed in the examples.

CN-A-102417555 discloses that ultra-high molecular weight polyethylene was produced in the presence of a Ziegler-Natta catalyst which was used in combination with an external electron donor. The document was silent on prepolymerisation.

WO-A-01/81432 discloses that ultra-high molecular weight polyethylene was produced in the presence of a Ziegler-Natta catalyst which could be prepolymerised. The document is silent on how the prepolymerisation is conducted. The examples did not disclose a prepolymerisation.

Problem to be Solved

In view of the prior art there still remains a problem that the ultra-high molecular weight polyethylene particles produced in a slurry polymerisation process have poor particle characteristics, such as a low bulk density and a great amount of agglomerates, which may lead to poor behaviour of the polymer particles in the process, such as during transfer operations, in product withdrawal and in degassing operations. Furthermore, low bulk density may lead to ineffective utilisation of reactor capacity. It is therefore desirable to overcome the problems observed in prior art processes.

SUMMARY OF THE INVENTION

The present invention provides a process for polymerising ethylene in the presence of an olefin polymerisation catalyst comprising titanium, magnesium and halogen in at least one polymerisation stage where ethylene is polymerised in slurry, the process comprising the steps of:

a. introducing the polymerisation catalyst into a pre-treatment step operated at a temperature of from 0 to 50° C. and a pressure of from 1 to 20 bar;
b. introducing an olefin to the pre-treatment step, wherein the olefin introduced into the pre-treatment step is a vinyl unsubstituted olefin selected from the group consisting of propylene, 1-butene, 4-methyl-1-pentene and vinyl cyclohexane;
c. polymerising the olefin on the polymerisation catalyst in the pre-treatment step to form a pre-treated catalyst comprising an olefin polymer on the polymerisation catalyst so that the ratio of the weight of the olefin polymer to the weight of the catalyst is from 0.1 to 10.0 g/g;
d. recovering the pre-treated catalyst from the pre-treatment step;
e. introducing ethylene, a diluent and the pre-treated catalyst into a slurry polymerisation step operated at a temperature of from 30 to 110° C. and a pressure of from 1 to 100 bar to polymerise ethylene on the pre-treated catalyst to produce polyethylene having a viscosity average molecular weight of from 700000 to 5000000 g/mol.

DETAILED DESCRIPTION

The process of the present invention involves pre-treating the catalyst with a small amount of olefin in polymerisation conditions in order to prepolymerise the olefin on the catalyst. The present inventors have found that surprisingly the small amount of prepolymer is sufficient to overcome the problems associated with the prior art processes.

Catalyst

The polymerisation is conducted in the presence of an olefin polymerisation catalyst. The catalyst may be any Ziegler-Natta catalyst which is capable of producing the ultra-high molecular weight ethylene polymer. Suitable catalysts are, among others, Ziegler-Natta catalysts based on a transition metal, such as titanium, zirconium and/or vanadium catalysts. Especially titanium based Ziegler-Natta catalysts are useful as they can produce polymers within a wide range of molecular weight with a high productivity.

Suitable Ziegler-Natta catalysts preferably contain a magnesium compound, an aluminium compound and a titanium compound, optionally supported on a particulate support.

The optional particulate support can be an inorganic oxide support, such as silica, alumina, titania, silica-alumina and silica-titania. Preferably, the support is silica.

The average particle size of the silica support can be typically from 1 to 100 μm. However, it has turned out that special advantages can be obtained if the support has an average particle size from 6 to 40 μm, preferably from 6 to 25 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

Each of the above-mentioned catalysts may further comprise an internal electron donor. Such donor may be selected from the group of linear and cyclic ethers; esters and diesters, such as aromatic esters; nitrogen-containing compounds; and sulphur containing compounds, such as thioethers.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

It is possible to use external donors with the catalyst. The use of such donors is known in the art. They may be selected from linear and cyclic ethers, esters, silicon ethers, nitrogen-containing compounds and such.

Pre-treatment of Catalyst

In the process of the invention the catalyst is pre-treated prior to introducing it into the slurry polymerisation step. The pre-treatment is done by prepolymerising a small amount of olefin, from 0.1 to 10 g, preferably from 0.1 to 2.0 g, per one gram of catalyst, on the catalyst. It is important that the amount of the olefin polymerised in the pre-treatment step is within the above-mentioned limits. If the amount is more than 10 g/g then there is a risk that the catalyst becomes agglomerated and its behaviour in the subsequent process steps, such as in catalyst feeder equipment, is poor. On the other hand, if the amount is less than 0.1 g/g then the benefits of the invention are not reached.

Preferably the ratio of the weight of the olefin polymer to the weight of the original solid catalyst component in the pre-treated catalyst is from 0.1 to 2.0 g/g, more preferably from 0.1 to 1.0 g/g, even more preferably 0.2 to 0.8 g/g and especially preferably from 0.3 to 0.6 g/g. The inventors have found that improved flow properties of the catalyst are obtained when the ratio is within these ranges.

The pre-treatment step can be conducted either batch-wise or continuously. However, considering the importance of keeping the ratio of the amount of the olefin polymerised in the pre-treatment step to the amount of the catalyst within the required limits it is preferred to conduct the pre-treatment step batch-wise. Alternatively, a continuously operating reactor with a plug flow type flow pattern would be possible to use. The reactors of these types ensure that each catalyst particle contains polymer after the pre-treatment step and that the proportion of the polymer is relatively constant over all particles.

The olefin polymerised in the pre-treatment step is selected from the group consisting of propylene, 1-butene, 4-methyl-1-pentene and vinyl cyclohexane and preferably from the group consisting of propylene, 4-methyl-1-pentene and vinyl cyclohexane. Especially preferably the olefin is propylene.

The amount of the olefin can be controlled in any method known in the art. One suitable method of controlling the amount of the polymerised olefin is to measure the flow rate of the olefin into the pre-treatment step and shut the feed when the desired amount has been fed. Another suitable method is to establish a correlation between the polymerised amount and the reaction time in the actual process conditions and discharge the olefin from the pre-treatment step when the time to reach the desired amount of polymer has elapsed.

The pre-treatment step is preferably conducted in slurry. The polymerisation is then conducted in a diluent into which the catalyst and optionally other reagents are suspended or dissolved. The diluent may be an inert diluent or, alternatively, the olefin may act as a diluent. Preferably an inert diluent is present in the pre-treatment step. Such diluent may be any compound wherein the olefin is soluble and which does not react with the polymerisation catalyst. Such suitable diluents are, for instance, alkanes having from 3 to 12 carbon atoms, halocarbons having from 3 to 12 carbon atoms and mixtures thereof. More preferably, the diluent is selected from alkanes having from 3 to 12 carbon atoms, fluorocarbons having from 3 to 12 carbon atoms, and mixtures thereof. Even more preferably the diluent is selected from alkanes having from 5 to 10 carbon atoms, perfluorinated fluorocarbons having from 5 to 10 carbon atoms, and mixtures thereof.

The catalyst is activated before or simultaneously it is contacted with the olefin. The activation is conducted by contacting the solid catalyst component with an activator as described earlier. The activators which work in normal polymerisation are also suitably used in the pre-treatment step. Trialkylaluminium compounds, such as triethylaluminium and tri-isobutylaluminium are especially useful activators.

Typically the molar ratio of the activator to titanium in the solid catalyst component is less what is used in normal polymerisation. Good results have been found for ratios of from 0.2 to 10, preferably from 0.3 to 3 and more preferably from 0.5 to 2 when the activator is a trialkylaluminium, such as triethylaluminium.

An external donor may also be present in the pre-treatment step. The external donors are electron-donating compounds which are contacted with the solid catalyst compound or with the activator or with both before or at the time of contacting the catalyst with the monomer. Preferably the external donor is an ether or a silicon ether. When such external donors are used then suitably the molar ratio of the donor to titanium in the solid catalyst component is from 0.05 to 1.0, preferably from 0.1 to 0.8, more preferably from 0.1 to 0.6. However, the external donor usually reduces the activity of the catalyst in the pre-treatment step. Therefore, external donors are preferably not used in the pre-treatment step.

The pre-treatment step is operated at a temperature of from 0 to 50° C. If the temperature in the pre-treatment step exceeds 50° C. then it is possible that the morphology of the pre-treated catalyst becomes poor, due to too vigorous polymerisation of the olefin on the catalyst. On the other hand, at a temperature of less than 0° C. the polymerisation rate becomes very low and long pre-treatment times need to be employed in order to reach the desired amount of polymer. A preferred operating range has been found with temperature being from 10 to 40° C., more preferably from 10 to 35° C., such as 10 to 30° C.

The pressure is not that critical. However, subatmospheric pressure would require expensive evacuation systems and very high pressures would require the equipment to be designed and build for such pressure ratings. Therefore, a pressure within a range of from about 1 bar to about 20 bar (absolute pressure) has been found feasible.

Hydrogen may be present in the pre-treatment step. The inventors have found that surprisingly the presence of hydrogen in the pre-treatment step reduces the amount of agglomerates in the pre-treated catalyst and if agglomerates are present then they are easily broken.

Slurry Polymerisation Step

In the slurry polymerisation step ultra-high molecular weight polyethylene is produced. The ultra-high molecular weight polyethylene has a viscosity average molecular weight of from 700 to 5000 kg/mol, preferably from 1000 to 5000 kg/mol and even more preferably from 1500 to 4000 kg/mol.

The ultra-high molecular weight polyethylene is produced by introducing the pre-treated catalyst as described above into a slurry polymerisation step where also ethylene and a diluent are introduced.

The slurry polymerisation step for producing the ultra-high molecular weight polyethylene is conducted at a temperature of from 30 to 110° C. Preferably, the temperature is from 35 to 75° C. and more preferably from 40 to 70° C., such as from 42 to 70° C. or from 45 to 70° C. The molecular weight of the polymer produced in the process tends to be higher when operating at the lower end of the temperature range. On the other hand, the polymerisation rate tends to increase with increasing temperature. The above-described ranges offer a good compromise between the molecular weight capability and the productivity.

The pressure in the slurry polymerisation step for producing the ultra-high molecular weight polyethylene is not really critical and may be chosen freely within a range of from about 1 to about 100 bar (absolute pressure). The choice of the operating pressure depends, among others, on the choice of the diluent used in the polymerisation.

A high content of residual catalyst in the ultra-high molecular weight polyethylene may result in the ultra-high molecular weight polyethylene having unacceptable properties, such as insufficient thermal stability or poor resistance to oxidation. Therefore, the content of the polymer produced in the pre-treatment step should be at most 0.2% by weight of the ultra-high molecular weight polyethylene, preferably at most 0.1% by weight of the ultra-high molecular weight polyethylene. Then also the catalyst residues in the ultra-high molecular weight polyethylene are on a sufficiently low level.

It is preferred that the slurry polymerisation step for producing the ultra-high molecular weight polyethylene is conducted in substantial absence of hydrogen. By "substantial absence of hydrogen" is meant that hydrogen is not separately introduced into the slurry polymerisation step. Hydrogen may, however, be present in the reactants as an impurity in very small amounts, typically less than 0.1% by mole and preferably less than 0.01% by mole. If the presence of hydrogen as an impurity in the reactants is expected then it is preferred to treat the reactants in a suitable manner to remove the hydrogen.

The diluent in the slurry polymerisation step for producing the ultra-high molecular weight polyethylene may be any suitable diluent which dissolves ethylene but not the ultra-high molecular weight polyethylene in the reaction conditions. Furthermore the diluent should not react with the polymerisation catalyst. Preferably the diluent is selected from alkanes having from 2 to 8 carbon atoms and their mixtures. More preferably the diluent is selected from the group consisting of propane, isobutane, n-butane and mixtures thereof.

The slurry polymerisation for producing the ultra-high molecular weight polyethylene may be conducted batch-wise or continuously. While batch-wise process may be suitable in laboratory or even pilot plant operations it would be preferred to operate the commercial scale reactors continuously.

The ethylene content in the fluid phase of the slurry may be from 1 to about 50% by mole, preferably from about 2 to about 20% by mole and in particular from about 2 to about 10% by mole. The benefit of having a high ethylene concentration is that the productivity of the catalyst is increased but the drawback is that more ethylene then needs to be recycled than if the concentration was lower.

The slurry polymerisation for producing the ultra-high molecular weight polyethylene may be conducted in any known reactor used for slurry polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the slurry polymerisation in one or more loop reactors, more preferably in one loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the slurry polymerisation continuously.

The average residence time in the slurry polymerisation step is typically from 20 to 120 minutes, preferably from 30 to 80 minutes. As it is well known in the art the average residence time T for a continuous process can be calculated from:

$$\tau = \frac{V_R}{Q_o} \qquad (\text{eq. 2})$$

Where $V_R$ is the volume of the reaction space (in case of a loop reactor, the volume of the reactor) and $Q_o$ is the volumetric flow rate of the product stream (including the polymer product and the fluid reaction mixture).

Further Polymerisation Steps

The process may include further polymerisation steps for producing different types of polymer as known in the art. Thus, the slurry polymerisation step may be preceded by a prepolymerisation step as disclosed, among others, in WO-A-1996/018662. It may be followed by further polymerisation steps for producing ethylene homo- or copolymers, such as slurry polymerisation steps for producing low molecular weight polyethylene as disclosed in WO-A-1992012182, and gas phase polymerisation steps for producing high molecular weight polyethylene as also disclosed in WO-A-1992012182.

According to an especially preferred embodiment the slurry polymerisation step is followed by at least one further polymerisation step, for instance another slurry polymerisation step for producing a low molecular weight ethylene homopolymer. Especially preferably, such further slurry polymerisation step is followed by a gas phase polymerisation step for producing a high molecular weight ethylene copolymer.

Polymer Recovery

When the polymer has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilisers, neutralisers, lubricating agents, nucleating agents, pigments and so on.

The polymer particles which are mixed with additives may be extruded to pellets as it is known in the art. As the person skilled in the art understands the ultra-high molecular weight polyethylene as such has a very high viscosity and therefore it is usually not extruded to pellets. However, blends of the ultra-high molecular weight polyethylene with other polymers have a lower viscosity and they can be extruded to pellets. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 180 to 230 kWh/ton. The melt temperature is typically from 220 to 290° C.

Description of Methods

Rheological Parameters

The polymer sample to be analysed was first stabilised with 2,6-di-tert-butyl-4-methylphenol prior to sample preparations. Then the test sample was moulded into a circular disk by compress moulding, with a diameter of 25 mm and with a thickness of 1.3 mm.

The characterisation of polymer melts by dynamic shear measurements complies with ISO standards 6721-1 and 6721-10. The measurements were performed on an Anton Paar MCR501 stress controlled rotational rheometer, equipped with 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \qquad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, $\eta^*$, the dynamic shear viscosity, $\eta'$, the out-of-phase component of the complex shear viscosity, $\eta''$ and the loss tangent, tan $\eta$, which can be expressed as follows:

$$G' = \frac{\sigma_0}{\gamma_0}\cos\delta [Pa] \quad (3)$$

$$G'' = \frac{\sigma_0}{\gamma_0}\sin\delta [Pa] \quad (4)$$

$$G^* = G' + iG'' [Pa] \quad (5)$$

$$\eta^* = \eta' - i\eta'' [Pa \cdot s] \quad (6)$$

$$\eta' = \frac{G''}{\omega} [Pa \cdot s] \quad (7)$$

$$\eta'' = \frac{G'}{\omega} [Pa \cdot s] \quad (8)$$

The determination of so-called Shear Thinning Index, which correlates with MWD and is independent of Mw, is done as described in equation 9.

$$SHI_{(x/y)} = \frac{Eta^* \text{ for } (G^* = x\ kPa)}{Eta^* \text{ for } (G^* = y\ kPa)} \quad (9)$$

For example, the $SHI_{(0.1/100)}$ is defined by the value of the complex viscosity, in Pa s, determined for a value of G* equal to 0.1 kPa, divided by the value of the complex viscosity, in Pa s, determined for a value of G* equal to 100 kPa.

The values of storage modulus (G'), loss modulus (G"), complex modulus (G*) and complex viscosity ($\eta^*$) were obtained as a function of frequency ($\omega$).

Thereby, e.g. $\eta^*_{300}$ (eta*$_{300}$) is used as abbreviation for the complex viscosity at the frequency of 300 rad/s and $\eta^*_{0.05}$ (eta*$_{0.05}$) is used as abbreviation for the complex viscosity at the frequency of 0.05 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

References:

[1] "Rheological characterisation of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] "The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

Activity of the Catalyst

The activity of the catalyst (in kg//(g·h)) was determined as the amount of polymer produced in the process (in kg) divided by the amount of catalyst fed into the process (in g) per unit of the polymerisation time (h).

Bulk Density

Polymer bulk density was measured according to the ASTM D1895 standard. Polymer powder was mixed properly and then added to a funnel with a closed bottom. A cylinder with a volume of 100 $cm^3$ was placed under the funnel. The bottom of the funnel was opened and the polymer powder was allowed to flow into the cylinder. All extra polymer power on the top of the cylinder was removed making the surface smooth and flat. Weight of the polymer powder inside the cylinder was measured and bulk density was calculated accordingly.

Particle Size and Particle Size Distribution

Particle size distribution was measured with a Coulter LS 200 instrument. The instrument is able to measure the PSD in a range of 0.4-2000 μm. The method is a laser diffraction method, where a laser beam is directed at the sample travelling in a flow-through cuvette.

The polymer sample was first pre-treated by screening out particles larger than 2 mm. The screened sample was mixed with isopropanol and put in an ultra-sound device in order to separate the particles from each other. The pre-treated sample was then placed in the sample unit and analysed. The result was calculated using a computer program provided with the instrument.

The PSD profiles are further normalised based on polymer yield using the equation below:

$$dp(0.5) = dc(0.5)\left[\frac{\rho c}{\rho p}(Y+1)\right]^{1/3}$$

It is generally accepted that the primary polymer particles grow surrounding the primary catalyst crystallites. When this view is valid, an average diameter of the primary polymer particles ($d_p(0.5)$) can be calculated using above equation.

Reference:

[4] Keii, T.; Terano, M.; Kimura, K.; Ishii, K. Chemical Rapid Communications 1987, 8 (583-587).

Intrinsic Viscosity ([η]) and Viscosity Average Molecular Weight ($M_v$)

Viscosity average molecular weight ($M_v$) was calculated according to ASTM D 4020-05 as follows:

$$M_v = 5.37 \times 10^4 \times [\eta]^{-1.37}$$

where [η] is the intrinsic viscosity.

Intrinsic viscosity for polyethylene was measured in decaline according to ISO 1628-3 standard. A viscometer delivered by Lauda and equipped with 4 Ubbelohde capillaries was utilised for the measurements. The Ubbelohde capillaries were placed in a heat bath filled with silicon oil. The polymer sample was diluted to a solution of 1 mg/ml in decaline, which was used as an analytical-reagent grade. The polymer sample was weighed and inserted directly into the capillary. The polymer solution was allowed to drain through the capillary and the efflux time for the polymer solution was determined. The efflux time was measured several times until the standard deviation was no more than 0.1 s. The Schulz-Blaschke equation was utilised to calculate the intrinsic viscosity from one single measurement.

$$[\eta] = \frac{\eta_{red}}{1 + K + C + \eta_{red}}$$

where $\eta_{red}$ is the reduced viscosity, K is a coefficient depending on polymer structure and concentration, and in this case 0.27, and C is the polymer solution concentration at 135° C. and calculated as followed:

$$C = \frac{m}{V\gamma}$$

where m is polymer mass, V is the solvent volume at 20° C. and γ is the ratio of solvent densities at 20° C. and 135° C., and in this case 1.107.

Reduced viscosity, $\eta_{red}$, is calculated as followed:

$$\eta_{red} = \frac{t_{solution} - t_{solvent}}{t_{solvent} \times C}$$

where $t_{solution}$ is the efflux time of the polymer solution and $t_{solvent}$ is the efflux time of the pure solvent (decaline).

Polymer Amount in the Pre-treated Catalyst

The amount of polymer in the pre-treated catalyst was determined by weighing the amount of the catalyst added into the pre-treatment step. After the pre-treatment the catalyst was recovered and dried in nitrogen atmosphere. The resulting pre-treated catalyst was then weighed and the amount of the polymer was taken as the difference between the weights of the pre-treated catalyst and fresh catalyst.

EXAMPLES

Catalyst Preparation 1

Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, TiCl$_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst is: Al/Mg/Ti=1.5/1.4/0.8 (mol/kg silica).

Catalyst Example 1

Into a stirred reactor having a volume of 125 cm³ were introduced 450 mg of the polymerisation catalyst prepared as described above in Catalyst Preparation 1 and 15 cm³ n-heptane together with a solution of 10% by weight of triethylaluminium in pentane so that the molar ratio of aluminium in triethylaluminium to titanium in the solid catalyst component, Al/Ti was 1 mol/mol. The stirrer speed was adjusted to 450 RPM and the temperature to 25° C. The pressure was then set to 2.73 bar (g) (or 3.73 bar (a)) by introducing gaseous propylene into the reactor. The reaction was allowed to proceed for 2.1 minutes after which the reactor contents were discharged and the pre-treated catalyst was recovered, dried and weighed. The thus obtained pre-treated catalyst was found to contain 0.14 grams of polymer per one gram of original solid catalyst component. The conditions are shown in Table 1.

Catalyst Examples 2 to 18

The procedure of example 1 was repeated except that perfluoro(1,3-dimethylcyclohexane) (PFC) was used as a diluent. The conditions were changed as shown in Table 1.

Catalyst Examples 19 and 20

The procedure of Example 2 was repeated except that diphenyldimethoxysilane was used as an external donor so that the molar ratio of the donor to titanium in the catalyst was 0.5 mol/mol. The conditions are shown in Table 1.

Comparative Catalyst Examples 1 to 4

The procedure of Example 2 was repeated except that ethylene was used as monomer instead of propylene in the prepolymerisation. The conditions are shown in Table 1.

Comparative Example 1

The slurry polymerisation runs were performed in an agitated reactor having a volume of 3.3 dm³.

Into the reactor was charged 1350 cm³ dehydrated propane. The solid polymerisation catalyst component prepared as described above in Catalyst Preparation was added together with triethylaluminium so that the amount of the solid catalyst component was 102 mg and the molar ratio of aluminium in triethylaluminium to titanium in the catalyst, Al/Ti, was 15 mol/mol. No hydrogen was added. The reactor temperature was adjusted to 50° C., ethylene was continuously added to maintain a partial pressure of ethylene of 2.2 bar, corresponding to about 4.0 mol-% of ethylene in the liquid, and stirring speed was 450 rpm. Total reactor pressure was kept around 20 barg.

The activity of the catalyst was 1.35 kg PE/(g cath). The resulting polymer had a bulk density of 150 g/cm³, median particle size of 397 μm and the fraction of particles having a diameter of greater than 600 μm, indicating the amount of agglomerates, was 36% by weight.

Polymerisation data is shown in Table 2. The polymer data is shown in Tables 3 and 4.

TABLE 1

Conditions in the pre-treatment step

| Catalyst Example | Diluent | H$_2$ mmol | Al/Ti mol/mol | T °C. | P bar | Time min | DP g$_{pol}$/g$_{cat}$ | Agglomerates |
|---|---|---|---|---|---|---|---|---|
| E1  | n-heptane | 0.0  | 1   | 25 | 2.7 | 2.1  | 0.14 |  |
| E2  | PFC | 0.0  | 1   | 25 | 2.7 | 6.3  | 0.30 |  |
| E3  | PFC | 0.0  | 1   | 25 | 2.7 | 25.9 | 1.08 |  |
| E4  | PFC | 0.0  | 1   | 25 | 2.7 | 4.6  | 0.13 |  |
| E5  | PFC | 0.0  | 1   | 25 | 2.7 | 3.8  | 0.14 | Slight |
| E6  | PFC | 0.0  | 1   | 25 | 2.7 | 12.0 | 0.72 |  |
| E7  | PFC | 0.0  | 0.5 | 25 | 2.7 | 12.0 | 0.19 |  |
| E8  | PFC | 0.0  | 1   | 35 | 2.7 | 8.0  | 0.57 |  |
| E9  | PFC | 0.0  | 1   | 45 | 2.7 | 8.0  | 0.49 | Significant |
| E10 | PFC | 0.82 | 1   | 35 | 2.7 | 8.0  | 0.67 |  |
| E11 | PFC | 1.6  | 1   | 45 | 2.7 | 6.0  | 0.56 | Significant |
| E12 | PFC | 1.6  | 1   | 25 | 2.7 | 8.0  | 0.48 | No |
| E13 | PFC | 0.0  | 1   | 25 | 1.7 | 8.3  | 0.44 | Slight |
| E14 | PFC | 0.82 | 1   | 35 | 2.7 | 6.0  | 0.71 |  |
| E15 | PFC | 0.82 | 1   | 25 | 2.7 | 8.0  | 0.43 | No |
| E16 | PFC | 0.0  | 1   | 25 | 2.7 | 8.0  | 0.91 |  |
| E17 | PFC | 0.82 | 1   | 35 | 2.7 | 6.0  | 0.28 | Some |
| E18 | PFC | 0.82 | 1   | 35 | 2.7 | 6.0  | 0.58 |  |
| E19 | PFC | 0.0  | 1   | 25 | 2.7 | 8.0  | 0.02 |  |
| E20 | PFC | 0.82 | 1   | 25 | 2.7 | 8.0  | 0.05 |  |
| CE1 | PFC | 0.0  | 1   | 25 | 0.9 | 11.0 | 0.48 |  |
| CE2 | PFC | 0.0  | 1   | 45 | 1.0 | 8.0  | 0.36 |  |
| CE3 | PFC | 1.4  | 1   | 25 | 1.1 | 11.0 | 0.50 |  |
| CE4 | PFC | 0.7  | 1   | 35 | 1.0 | 10.0 | 0.40 |  |

Example 1

The procedure of Comparative Example 1 was repeated except that instead of the untreated solid catalyst component a pre-treated catalyst component produced according to Catalyst Example 2 was used in an amount of 48 mg, calculated as the amount of pure solid catalyst component excluding the polymerised propylene from the pre-treatment step.

The activity of the catalyst was 1.69 kg PE/(g cat·h). The bulk density (BD) of the polymer was 210 g/cm$^3$.

Polymerisation data is shown in Table 2. The polymer data is shown in Tables 3 and 4.

Examples 2 to 7

The procedure of Example 1 was repeated except that the pre-treated catalyst and its amount calculated as pure solid catalyst component excluding the polymerised propylene were as indicated in Table 2. The polymer data is shown in Tables 3 and 4.

TABLE 2

Slurry polymerisation tests done with propylene prepolymerised catalysts.

| Polymerisation Example | Catalyst Example | Catalyst amount (mg)$^a$ | Polymer yield (g) | Polymerisation time (min) | Activity (kg$_{pol}$/g$_{cat}$/h) |
|---|---|---|---|---|---|
| CE1 | Reference | 102 | 97.7  | 42.7 | 1.35 |
| 1   | E02 | 48  | 57.7  | 42.7 | 1.69 |
| 2   | E13 | 76  | 101.1 | 44.0 | 1.82 |
| 3   | E09 | 88  | 125.3 | 43.7 | 1.96 |
| 4   | E12 | 90  | 116.9 | 44.0 | 1.78 |
| 5   | E15 | 101 | 142.6 | 44.0 | 1.92 |
| 6   | E13 | 98  | 132.5 | 44.0 | 1.84 |
| 7   | E15 | 99  | 130.1 | 44.0 | 1.78 |

TABLE 3

Particle size data for selected UHMWPE polymer produced using non-prepolymerised and propylene prepolymerised catalyst

| Polymerisation Example | Catalyst Code | MEAN dP (μm) | dP 10% (μm) | dP 50% (μm) | dP 90% (μm) | Fraction above dP 600 μm (%) |
|---|---|---|---|---|---|---|
| CE1 | Reference | 549 | 102 | 397 | 1300 | 36 |
| 2   | E13 | 223 | 50 | 155 | 502 | 6.9 |
| 3   | E09 | 217 | 53 | 142 | 483 | 6.8 |
| 4   | E12 | 252 | 50 | 166 | 589 | 9.7 |
| 5   | E15 | 247 | 58 | 170 | 543 | 8.3 |

TABLE 4

Viscosity average molecular weight ($M_V$) values for UHMWPE polymer samples

| Polymerisation Example | DP ($g_{pol}/g_{cat}$) | BD (g/dm$^3$) | IV (dl/g) | Mv ($10^6$ g/mol) | $\eta^*_{0.05}$ ($10^6$ Pa * s) |
|---|---|---|---|---|---|
| C1 | Ref. | 150 | — | 2.70 | 10.2 |
| 1 | 0.3 | 210 | 17 | 2.61 | 14.2 |
| 2 | 0.44 | 230 | — | — | 14.8 |
| 3 | 0.49 | 240 | 19 | 2.96 | 11.2 |
| 4 | 0.48 | 240 | — | — | 11.8 |
| 5 | 0.43 | 230 | 16 | 2.40 | 11.9 |

Comparative Examples 2 to 5

The procedure of Example 1 was repeated except that the pre-treated catalyst was made according to the Comparative Catalyst Examples 1 to 4 and its amount calculated as pure solid catalyst component excluding the polymerised propylene were as indicated in Table 5. The polymer data is shown in Table 6.

TABLE 5

Slurry polymerisation tests done with ethylene prepolymerised catalysts.

| Polymerisation Example | Catalyst Example | Catalyst amount (mg)$^a$ | Polymer yield (g) | Polymerisation time (min) | Activity ($kg_{pol}/g_{cat}/h$) |
|---|---|---|---|---|---|
| C1 | Reference | 102 | 97.7 | 42.7 | 1.35 |
| C2 | CE1 | 89 | 72.3 | 41.7 | 1.17 |
| C3 | CE2 | 108 | 85.8 | 43.7 | 1.1 |
| C4 | CE3 | 94 | 76.6 | 44.0 | 1.15 |
| C5 | CE4 | 108 | 90.3 | 44.0 | 1.15 |

TABLE 6

Particle size data for selected UHMWPE polymer produced using non-prepolymerised and ethylene prepolymerised catalyst

| Polymerisation Example | Catalyst Code | MEAN dP (μm) | dP 10% (μm) | dP 50% (μm) | dP 90% (μm) | Fraction above dP 600 μm (%) |
|---|---|---|---|---|---|---|
| C1 | Reference | 549 | 102 | 397 | 1300 | 36 |
| C2 | CE1 | 491 | 117 | 361 | 1081 | 28.0 |
| C3 | CE2 | 385 | 107 | 283 | 805 | 17.7 |
| C4 | CE3 | 675 | 120 | 505 | 1546 | 44.1 |
| C5 | CE4 | 547 | 129 | 388 | 1237 | 35.7 |

The data shows that, surprisingly, when propylene has been used as a monomer in the catalyst pretreatment step then the morphology of the UHMWPE is better compared to when ethylene was used in the pretreatment step.

Catalyst Preparation 2

A. Preparation of Pre-treated Support Material:

A jacketed 160 dm$^3$ stainless steel reactor equipped with a helical mixing element was pressurized with N$_2$ to 2.0 barg and depressurized down to 0.2 barg until the O$_2$ level was less than 3 ppm. The vessel was then charged with heptane (20.5 kg) and 2,2-di(tetrahydrofuryl)propane (0.38 kg; 2.06 mol; DTHFP). The obtained mixture was stirred for 20 min at 40 rpm. The 45 μm MgCl$_2$*3EtOH carrier (5.0 kg; DTHFP/Mg=0.1 mol/mol; 20.3 mol of Mg; 9.86 wt-% of Mg) was added to the reactor with stirring. This suspension was cooled to approximately −20° C. and the 25 wt % solution of triethylaluminum (30.4 kg, 66.6 mol of Al; Al/EtOH=1.0 mol/mol) in heptane was added in aliquots during 2.5 h time while keeping the temperature below 0° C. After the TEA addition, the reaction mixture was gradually heated to 80° C. over a period of 2.5 h and kept at this temperature for additional 20 min at 40 rpm. The suspension was allowed to settle for 10 min, and the mother liquor was removed through a 20 μm filter net in the bottom of the reactor during 10 min. The vessel was charged with warm toluene (43 kg) and then stirred at 40 rpm for 20 min at 40-60° C. The suspension was allowed to settle for 10 min at 40° C. and the liquid removed through a 20 μm filter net in the bottom of the reactor during 10 min.

B. Catalyst Preparation:

The vessel containing the pre-treated support material was charged with toluene (43 kg) and then cooled to approximately 30° C. Neat TiCl$_4$ (3.85 kg, 20.3 mol; Ti/Mg =1.0 mol/mol) was added. The obtained suspension was heated to approximately 90° C. over a period of 2 h and kept at this temperature for additional 1 h with stirring at 40 rpm. The suspension was allowed to settle for 10 min at approximately 90° C. and the mother liquor was removed through a 20 μm filter net in the bottom of the reactor during 10 min. The obtained solid material was washed twice with toluene (43 kg each) at ≈90° C. and once with heptane (34 kg) at 40° C. All three of these washing steps used the same sequence of events: addition of preheated (90 or 40° C.) solvent, then stirring at 40 rpm for 30 min, allowing the solid to settle for 10 min, and then removal of liquid through a 20 μm filter net in the bottom of the reactor during 10 min.

The obtained catalyst was mixed with 15 kg of white oil and dried 4 h at 40-50° C. with nitrogen flow (2 kg/h) and vacuum (−1 barg). The dry catalyst yield was 2.62 kg (83.5% based on Mg).

Catalyst Example 21

The procedure of Catalyst Example 5 was repeated except that the solid catalyst component prepared according to Catalyst Preparation 2 was used instead of that produced according to Catalyst Preparation 1. The data can be found in Table 5.

TABLE 7

Conditions in the pre-treatment step

| Example | Diluent | H$_2$ mmol | Al/Ti mol/mol | T ° C. | P bar | Time min | DP $g_{pol}/g_{cat}$ |
|---|---|---|---|---|---|---|---|
| E21 | PFC | 0.7 | 1 | 25 | 2.7 | 8.1 | 0.56 |

Comparative Example 6

The procedure of Comparative Example 1 was repeated except that the solid catalyst component prepared according to Catalyst Preparation 2 was used instead of that produced according to Catalyst Preparation 1.

Example 8

The procedure of Comparative Example 6 was repeated except that the pre-treated catalyst according to Catalyst Example 28 was used instead of the solid catalyst component according to Catalyst Preparation 2. The data is shown in tables 6 and 7.

TABLE 8

Slurry polymerisation tests done with propylene prepolymerised catalysts:

| Example | Catalyst Example | Catalyst amount (mg) | Polymer yield (g) | Poly-merization time (min) | Activity (kg$_{pol}$/g$_{cat}$/h) | Bulk density (kg/m$_3$) |
|---|---|---|---|---|---|---|
| C6 | Ref. | 81.5 | 74 | 42.7 | 1.27 | 110 |
| 8 | E21 | 91.6 | 318 | 32.3 | 6.45 | 340 |

TABLE 9

Particle size data for selected UHMWPE polymer produced using non-prepolymerised and propylene prepolymerised catalyst:

| Example | Catalyst Example | MEAN dP (μm) | dP 10% (μm) | dP 50% (μm) | dP 90% (μm) | Fraction above dP 600 (μm) (%) |
|---|---|---|---|---|---|---|
| CE6 | Reference | 618 | 213 | 570 | 1101 | 47 |
| 8 | E21 | 364 | 213 | 329 | 553 | 7.9 |

The invention claimed is:

1. A process for polymerising ethylene in the presence of an olefin polymerisation catalyst comprising titanium, magnesium and halogen in at least one polymerisation stage where ethylene is polymerised in slurry, the process comprising the steps of:
   a. introducing the polymerisation catalyst into a pre-treatment step operated at a temperature of from 25 to 40° C. and a pressure of from 1 to 20 bar;
   b. introducing an olefin into the pre-treatment step wherein the olefin introduced into the pre-treatment step is a vinyl unsubstituted olefin selected from the group consisting of propylene, 1-butene, 4-methyl-1-pentene and vinyl cyclohexane;
   c. polymerising the olefin on the polymerisation catalyst in the pre-treatment step to form a pre-treated catalyst comprising a single olefin polymer on the polymerisation catalyst so that the ratio of the weight of the olefin polymer to the weight of the original solid catalyst component is from 0.1 to 10 g/g;
   d. recovering the pre-treated catalyst from the pre-treatment step;
   e. introducing ethylene, a diluent and the pre-treated catalyst into a slurry polymerisation step operated at a temperature of from 30 to 110° C. and a pressure of from 1 to 100 bar to polymerise ethylene on the pre-treated catalyst to produce polyethylene having a viscosity average molecular weight of from 700000 to 5000000 g/mol.

2. The process according to claim 1 wherein the viscosity average molecular weight of the polyethylene is from 1000000 to 5000000 g/mol.

3. The process according to claim 1 wherein hydrogen is not introduced into the slurry polymerisation step.

4. The process according to claim 1 wherein the diluent in the slurry polymerisation step is selected from alkanes having from 2 to 8 carbon atoms and their mixtures.

5. The process according to claim 4 wherein the diluent is selected from the group consisting of propane, isobutane, n-butane and mixtures thereof.

6. The process according to claim 1 wherein the ratio of the weight of the olefin polymer to the weight of the original solid catalyst component in the pre-treated catalyst is from 0.1 to 1.0 g/g.

7. The process according to claim 1 wherein the olefin is propylene.

8. The process according to claim 1 wherein the pre-treatment step is conducted in slurry.

9. The process according to claim 8 wherein a diluent is present in the pre-treatment step.

10. The process according to claim 9 wherein the diluent is selected from the group consisting of alkanes and halocarbons having from 3 to 12 carbon atoms and mixtures thereof.

11. The process according to claim 10 wherein the diluent is selected from the group consisting of alkanes having from 5 to 10 carbon atoms, perfluorinated fluorocarbons having from 5 to 10 carbon atoms, and mixtures thereof.

12. The process according to claim 1 wherein hydrogen is present in the pre-treatment step.

13. The process according to claim 1 wherein the slurry polymerisation step for producing polyethylene having the viscosity average molecular weight of from 700000 to 5000000 g/mol is conducted at a temperature within the range of from 40 to 70° C.

14. The process according to claim 1 wherein the content of the olefin polymer produced in the pre-treatment step is at most 0.2% of the amount of the polyethylene having the viscosity average molecular weight of from 700000 to 5000000 g/mol produced in the slurry polymerisation step.

15. The process according to claim 1, wherein no external donor is used in the pre-treatment step.

* * * * *